United States Patent
Riek et al.

(10) Patent No.: US 11,182,140 B2
(45) Date of Patent: Nov. 23, 2021

(54) ACTIVE REPRESENTATION OF A COMPOSITE APPLICATION

(71) Applicant: Red Hat, Inc., Raleigh, NC (US)

(72) Inventors: Daniel Riek, Raleigh, NC (US);
Christoph Goern, Raleigh, NC (US);
Langdon White, Raleigh, NC (US);
Ian McLeod, Raleigh, NC (US); Daniel Walsh, Raleigh, NC (US); Aaron Weitekamp, Raleigh, NC (US);
Michael Virgil, Raleigh, NC (US);
Vaclav Pavlin, Raleigh, NC (US); Jay Vyas, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 526 days.

(21) Appl. No.: 14/951,668

(22) Filed: Nov. 25, 2015

(65) Prior Publication Data

US 2017/0147319 A1    May 25, 2017

(51) Int. Cl.
*G06F 8/61*    (2018.01)
*H04L 29/08*    (2006.01)

(52) U.S. Cl.
CPC .............. *G06F 8/63* (2013.01); *H04L 67/06* (2013.01); *H04L 67/34* (2013.01)

(58) Field of Classification Search
CPC ..... G06F 8/61; G06F 8/10; G06F 8/60; G06F 9/44505; H04L 67/10
See application file for complete search history.

(56) References Cited

U.S. PATENT DOCUMENTS

| 8,327,350 | B2 | 12/2012 | Chess et al. |
| 8,627,426 | B2 | 1/2014 | Lucovsky et al. |
| 8,661,456 | B2 * | 2/2014 | Wang ............... G06F 9/547 719/318 |
| 8,918,448 | B2 | 12/2014 | DeLuca et al. |
| 9,047,133 | B2 | 6/2015 | Winterfeldt et al. |
| 9,052,961 | B2 | 6/2015 | Mangtani et al. |
| 9,712,607 | B2 * | 7/2017 | Austel ............... H04L 67/10 |

(Continued)

FOREIGN PATENT DOCUMENTS

| WO | WO 2014165944 A1 * | 10/2014 | ......... G06F 9/44521 |
| WO | WO 2015/065392 A1 | 5/2015 | |

OTHER PUBLICATIONS

"Cloudify FAQ" http://getcloudify.orq/FAQ_cloud_devops_automation.html, accessed Nov. 23, 2015, 10 pages.

(Continued)

*Primary Examiner* — S. Sough
*Assistant Examiner* — Cheneca Smith
(74) *Attorney, Agent, or Firm* — Haynes and Boone, LLP

(57) ABSTRACT

Methods, systems, and computer program products are included for deploying a composite application. A method includes receiving, at a computing device, a container image that includes a nulecule. The nulecule is parsed to identify a first service, a second service, and a parameter of the first service. An input value is received corresponding to the parameter of the first service. A configuration value of the first service is modified to include the input value. The first service and the second service are deployed on the computing device, with the first service being configured with the configuration value.

20 Claims, 4 Drawing Sheets

(56) References Cited

U.S. PATENT DOCUMENTS

| | | | | |
|---|---|---|---|---|
| 2006/0015589 | A1* | 1/2006 | Ang | H04L 67/34 709/220 |
| 2012/0311611 | A1* | 12/2012 | Wang | G06F 9/541 719/318 |
| 2012/0324069 | A1* | 12/2012 | Nori | G06F 9/5066 709/222 |
| 2014/0196022 | A1* | 7/2014 | Skutin | G06F 8/61 717/176 |
| 2014/0279908 | A1 | 9/2014 | Manfe et al. | |
| 2014/0282207 | A1 | 9/2014 | Wouhaybi et al. | |
| 2016/0055014 | A1* | 2/2016 | Gallimore | G06F 9/44521 719/320 |
| 2016/0321051 | A1* | 11/2016 | Austel | H04L 67/10 |

OTHER PUBLICATIONS

Claus Pahl, "Containerisation and the PaaS Cloud" Irish Centre for Cloud Computing and Commerce IC4 and the Irish Software Research Centre Lero, School of Computing, Dublin City University, Dublin 9, Ireland, http://www.computing.dcu.ie/~cpahl/papers/CCM-2015-Pahl-Containers-PaaS-Cloud.pdf, May 6, 2015, 6 pages.

Sharone Zitzman et al. "Docker . . . Containers, Microservices and Orchestrating the Whole Symphony" https://dzone.com/articles/dockercontainers-microservices, Jan. 22, 2015, 19 pages.

Thomas Herve, "Multi-Tenant Docker with OpenStack Heat" http://techs.enovance.com/7104/multi-tenant-docker-with-openstack-heat, Jul. 29, 2014, 9 pages.

James Turnbull, "The Docker Book" http://www.virtualization.co.kr/reference/TheDockerBook_sample.pdf, Apr. 25, 2015, 65 pages.

* cited by examiner

200 

```
id: webserver-app                                    202
─ ─ ─ ─ ─ ─ ─ ─ ─ ─ ─ ─ ─ ─ ─ ─ ─
graph:
-name: database                                      204
source: container_manager://database
params:
        -name: db_user
        description: Database User
        -name: db_pass
        description: Database Password
        -name: db_name
        description: Database Name
-name: webserver
source: container_manager://webserver
        - name: hostport
          description: The host TCP port
          default: 80
─ ─ ─ ─ ─ ─ ─ ─ ─ ─ ─ ─ ─ ─ ─ ─ ─
artifacts:
container manager:                                   206
        -file://artifacts/containermanager/webserver-app_run
orchestrator:
        -file://artifacts/orchestrator/webserver-app.json
```

FIG. 2

ACTIVE REPRESENTATION OF A COMPOSITE APPLICATION

BACKGROUND

Current container packaging technologies allow for packaging individual services or applications in container images and deploying those container images on computing devices to provide services. Container images use a standardized format for compatibility with various different computing devices and environments. Accordingly, by packaging services in container images, the container images may be distributed and deployed on computing devices having different computing environments.

One issue that may arise is that a service that is deployed from a container image may depend upon one or more other services. Accordingly, the service that is included in a container image may fail to execute, execute with errors, or otherwise cause issues in configuring and deploying the service and one or more other services.

Therefore, a need exists to efficiently aggregate and deploy multiple services. Thus, while current container packaging technologies have been generally adequate for handling individual services, the techniques disclosed herein provide a more efficient solution for handling multiple services.

BRIEF SUMMARY

According to an example, a computer-implemented method includes receiving, at a computing device, a container image that includes a nulecule file and one or more other files; parsing the nulecule file to identify a first service, a second service, and a parameter corresponding to the first service; requesting, from a container registry, a first container image corresponding to the first service and a second container image corresponding to the second service; receiving the first container image and the second container image from the registry; receiving an input value corresponding to the parameter; modifying a configuration value corresponding to the first service to include the input value; deploying the first service by instantiating the first container image; and deploying the second service by instantiating the second container image.

According to an example, a non-transitory computer-readable medium includes computer-readable instructions executable by a processor to cause the processor to: receive, at a computing device, a container image that includes a nulecule; parse the nulecule to identify a first service, a second service, and a parameter of the first service; receive an input value corresponding to the parameter; modify a configuration value of the first service to include the input value; and deploy the first service and the second service on the computing device, wherein the deployed first service is configured with the configuration value.

According to an example, a system includes a processor and a memory. The system further includes a nulecule file stored on the computer-readable storage medium, the nulecule including information that defines a plurality of services of a composite application, wherein the nulecule file references a first container image corresponding to a first service of the plurality of services and a first set of parameters corresponding the first service, wherein the nulecule file references a second container image corresponding to a second service of the plurality of services and a second set of parameters corresponding the second service; and a content manager that packages the nulecule file in a container image and sends the container image to a registry.

BRIEF DESCRIPTION OF THE DRAWINGS

Various examples of the present disclosure will be understood more fully from the detailed description given below and from the accompanying drawings of various examples of the disclosure.

FIG. 2 is a block diagram illustrating an example layout of a nulecule, in accordance with various examples of the present disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
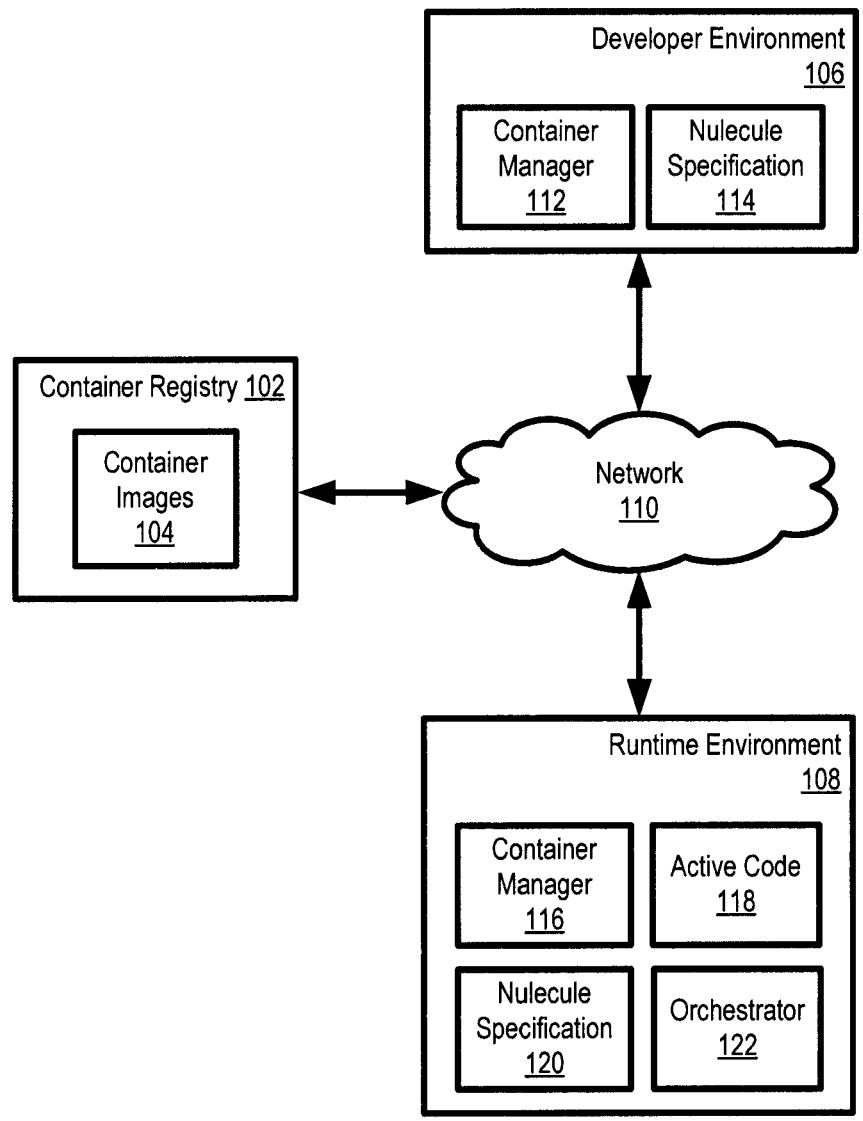
FIG. 1 is a block diagram illustrating a system architecture for composite application packaging, distribution and deployment, in accordance with various examples of the present disclosure.

FIG. 1 illustrates a system architecture 100 for composite application packaging, distribution and deployment, in which examples of the present disclosure can be implemented.

System architecture 100 includes a container registry 102. In some examples, the container registry 102 is structured as a computing device such as a rack mount server, desktop computer, laptop computer, and so forth. While one container registry 102 is illustrated, in some examples there may also be other container registries in addition to the container registry 102.

The container registry 102 is structured to receive container images from other computing devices, store container images (e.g., container images 104), and send container images to other computing devices. In some examples, the container registry 102 may be configured as a centralized registry for storing container images in the system 100. In other examples, the container registry 102 may be structured to include a plurality of container registries. For example, the container registry 102 may be structured as a distributed architecture, such as a peer-to-peer architecture.

In some examples, the container registry 102 includes one or more databases to manage container images stored in the container registry 102. In some examples, these databases may be searchable to list container images that are contained within the database.

In some examples, container registry 102 is structured to store the container images 104 in a local storage device, while in other examples the container images 104 may be stored in an external or remote storage that is communicatively coupled to the container registry 102. The container registry 102 may be structured to store and/or distribute the container images 104 in an encrypted or decrypted format.

In the present example, the container images 104 are structured as one or more container images that are stored in the container registry 102 as files. Each container image is structured as a wrapper for content that is included within the container image. For example, a container image may be an archive file type that includes one or more files that have the same or different file types. In more detail, a container image may include within the container image other container images and/or files that are not container images.

In the present example, each container image is a packaged software stack that is a self-containing archive that carries a software application and the software stack to execute that software application. A software stack may be a group of software applications that are executed together to provide services that interact with one another to provide for a common purpose. A container image may also include references to software applications, references to other container images, data files, audio or image files, nulecule files, and so forth. In the present example, each software application and its associated files(if any) may be referred to as a service.

In some examples, a container image is a standardized unit that includes a software application and dependencies of the software application. For example, a container image may include multiple software applications, system tools corresponding to the software applications, libraries corresponding to the applications, a nulecule file that defines parameters and artifacts corresponding to the applications, and so forth. Accordingly, the container image may include both software applications, the operating environment in which to run the software applications, and any configuration information corresponding to the applications. By providing an operating environment and configuration information in addition to the software applications themselves, the system provides improved accessibility, efficiency, and ease of use for deploying the applications in a computing environment.

In the present example, the container images 104 are structured according to a standardized format. In some examples, the standardized format includes the Open Container Initiative (OCI) Container format. In other examples, the standardized format includes the App Container Images (ACI) format. Other container formats may also be used as well. The particular format of the container images 104 may vary, and the above container formats are merely provided as examples.

In the present example, because the container images 104 are structured in a standard format, the container images 104 are compatible and portable across computing platforms. Accordingly, various heterogeneous computing platforms, such as the developer environment 106 and runtime environment 108 are able to package, transport and/or deploy the container images 104.

In the present example, one or more container images of the container images 104 include multiple services, such as services provided by software applications, which interact with one another. For example, a first container image may include one or more software applications and a set of data files for providing a web server service. A second container image may include one or more other software applications and another set of data files for providing a database service. The web server and database services are described merely as an example of services that may communicate with one another and may be beneficial to package together in a container image, by referencing the first and second container images in a third container image, or by including the first and second container images in a third container image. These examples are not intended to be limiting and it is intended that various different services may be packaged together in container images.

The container images (such as the third container image described above) that include multiple services are referred to herein as composite applications. A composite application may also be referred to as a multi-container image, an aggregate application container image, and a multi-container application. In another example, a composite application may include the content of a plurality of container images that are packaged within the composite application. In other words, a composite application may include the content of subset container images corresponding to multiple services and/or may include the subset container images by reference. In some examples, a composite application may include one or more applications and one or more dependency applications, such that a software stack is provided by the composite application. In the present example, each application may be executed to provide a service. Accordingly, in some examples, the applications are referred to as services.

In the present example, container images that are composite applications are structured to include a nulecule file, which may also be referred to as a nulecule. A nulecule may provide a specification/manifest for the services included in the composite application. The nulecule may include information to define the services corresponding to the composite application. For example, a metadata description provided in the nulecule may include identifiers of the services, references to container images corresponding to services, parameters of the services, runtime order of the services, dependencies of the services, artifacts that are to be executed to process the container images, and so forth.

In the present example, a nulecule file defines the services corresponding to one or more software applications that are included within the container image. The one or more applications may be included within the container image by (1) including the files themselves in the container image, and/or by (2) including references to the files at external locations, such as locations of the files in a registry. In some examples, a container image may include the content of software applications by storing other container images that correspond to the software applications. For example, each service may be included in a separate container image that stores a software application and other files corresponding to the particular service. The nulecule may include references to the container images of the services that are stored in a registry.

In the present example, the nulecule is structured according to a standardized format. In some examples, the nulecule is structured as a text file. The nulecule includes lines that include preconfigured keywords that are defined by a nulecule specification. The keywords of the nulecule specify features corresponding to the services included in the composite application. For example, the nulecule may include a name keyword that specifies each of the services of the composite application, and a parameters keyword that specifies parameters of the services. In more detail, for example, if a service of the composite application is a database, the nulecule may specify an identifier of the database, a container image corresponding to the database, and parameters of the database, such as login information (e.g., username and password information) to access the database, network location information (e.g., port and internet protocol addresses corresponding to the database), and so forth. These are merely some examples. In other examples, each service of the composite application may be configured with additional or fewer parameters that are customized for the particular service.

In some examples, the nulecule may also be structured to define a runtime order corresponding to each of the services, such that some services of the composite application may be instantiated prior to other services. For example, in the web server and database example described above, it may be advantageous to run the database service prior to the web server service, such that the web server does not trigger errors by attempting to access the database when the database is not yet instantiated. In the present example, instantiating each service may include executing instructions of one or more applications corresponding to the service by a running process. A container runtime may be used to instantiate the one or more software applications that are packaged and/or referenced in the container image. The running instance corresponding to the container image may be referred to as a container.

In some examples, for each service that is included in the composite application, the nulecule may specify a reference to each container image in the registry, such that the container images may be retrieved and deployed from the registry. For example, the nulecule may be packaged in a container image. Upon retrieving the container image that contains the nulecule, the nulecule may be parsed by the active code 118 to identify references to the container images corresponding to the services described in the nulecule. These references may be passed to the container manager 116. The container registry 102 may be queried by the container manager 116 with the identities of the references to the container images. Responsive to the queries, the container registry 102 may provide the container images corresponding to the identities of the references. These provided container images may then be processed by the container manager 116 on the runtime environment 108 so that the services included in the container images may be deployed, for example by instantiating the services using orchestrator 122 as directed by the active code 118. In other examples, the content of the container images of the services may be contained within a same container image as the nulecule itself, rather than the container images being included by reference from the registry 102.

In some examples, the standardized format of the nulecule may be specified by a nulecule specification template format. Accordingly, because the nulecule is structured in a standard format, the nulecule is compatible and portable across computing platforms. Accordingly, various computing platforms, such as the developer environment 106 and runtime environment 108 are able to package, transport and deploy the nulecule that is contained within a container image. The nulecule specification format may be shared across computing platforms such that the various computing platforms are able to interact with the nulecule.

In the present example, container registry 102, developer environment 106 and runtime environment 108 are communicatively coupled by a network 112 that may include one or more network devices and transport media. For example, network devices include routers, hubs, and switches. Transport media include, for example, Ethernet cable, Fibre Channel Cable, wireless signals, and so forth.

While the illustration depicts a single developer environment 106 and a single runtime environment 108, in other examples there may be a plurality of developer environments and/or runtime environments. For example, the developer environment 106 may provide a composite application to the container registry 102, with the purpose of making the composite application available and distribute the composite application to a plurality of runtime environments.

The developer environment 106 is structured to package a container image, such as a composite application container image and transport the container image to the container registry 102. In some examples, the developer environment 106 is structured as a computing device such as a rack mount server, desktop computer, laptop computer, and so forth.

In particular, the developer environment 106 includes a container manager 112 that packages services and/or nulecules into container images and sends the container images to the container registry 102. In the present example, the container manager 112 is structured to build/package the composite application and to transport the composite application to the container registry 102 as a container image. The container manager 112 may also provide a runtime environment for instantiating container images in the developer environment 106. Merely by way of example, container manager 112 may include artifacts such as DOCKER and/or RKT. In other examples other container managers and/or container runtime environments may be included instead of, or in addition to those mentioned above.

In the present example, the developer environment is also structured with a nulecule specification 114. In some examples, the nulecule specification 114 may be a template language that describes a format corresponding to a nulecule. For example, the nulecule specification 114 may specify the format/structure to be used for a nulecule, such as keywords, delimiters, and so forth. In some examples, the nulecule specification 114 may also be structured to specify a container manager to use for packaging the nulecule and/or services corresponding to the nulecule. Accordingly, the nulecule specification 114 is structured to provide a standardized format for a nulecule, such that other computing devices that are configured with the nulecule specification 114 may transport and/or parse the nulecule.

The system 100 also includes a runtime environment 108. The runtime environment 108 is structured to receive a container image, such as a composite application that is structured as a container image, from the container registry 102. The runtime environment 108 is structured to configure parameters corresponding to the composite application. The runtime environment 108 is structured to deploy the composite application in the runtime environment 108. For example, the runtime environment 108 may deploy the composite application by retrieving container images associated with the composite application, unpacking the container images, and instantiating the applications/services corresponding to the container images. In some examples, the runtime environment 108 is structured as a computing device such as a rack mount server, desktop computer, laptop computer, and so forth.

The runtime environment 108 is structured with a container manager 116, which may be a same container manager as container manager 112. The container manager 116 is structured to use a same container image format as the container image format used by container manager 112, such that the container manager 116 may deploy container images that are packaged by the container manager 112.

The runtime environment 108 is structured with active code 118. The active code 118 is structured to parse/process nulecules that are included in container images and provide the parsed information to the container manager 116 and orchestrator 122 to allow the container manager 116 and orchestrator 122 to package, transport, and instantiate a container image that is a composite application. For example, the container manager 116 and orchestrator 112 may parse a nulecule of a container image, retrieve container images corresponding to the services specified in the nulecule, and instantiate the services from the retrieved container images. In the present example, the active code 118 is a component that is configured to parse the information from the nulecule to identify services referenced in the nulecule and parameters corresponding to the services. After parsing the information, the active code 118 is structured to provide the information to the container manager 116, such that the container manager 116 may request the container images corresponding to the services from the container registry 102. In some examples, the providing of the information to the container manager 116 is performed by executing the container manager 116 via a command line command that includes as parameters the identifiers corresponding to the services.

The runtime environment 108 is structured with a nulecule specification 120, which may be a same nulecule specification as nulecule specification 114, such that the nulecule specifications provide a common nulecule format that is used by the developer environment 106 and the runtime environment 108. Accordingly, by using a common nulecule format, the active code 118 is able to parse information specified in the nulecule to identify references to the services specified in the nulecule and the parameters corresponding to the services.

The runtime environment 108 is structured with an orchestrator 122. The orchestrator 122 is communicatively coupled to the active code 118, such that the orchestrator receives identification of the services of the composite application and the parameters of the services, and uses the received information to instantiate the services in the runtime environment. Some examples of orchestrators include artifacts such as OPENSHIFT, KUBERNETES, and FIG. However, in other examples, other orchestrators may be used instead or in addition to those described above. In some examples, the particular orchestrator to execute for instantiating the services may be specified in the nulecule of the composite application.

In the present example, artifacts are software applications that operate on the container images and/or services contained in the container images. For example, container managers and orchestrators are described herein as artifacts. The nulecule may specify particular artifacts, such as a container manager and orchestrator, which are to be used to package, transport and/or deploy the composite application. Additional, fewer, or other artifacts may also be specified in the nulecule. Further, artifacts may be specified in the nulecule to perform other tasks corresponding to the composite application beyond the packaging, transporting, and deploying of the composite application.

FIG. 2 illustrates an example layout of a nulecule 200, in which examples of the present disclosure can be implemented.

In the present example, nulecule 200 is structured to define a composite application by specifying metadata information such as service identifiers, parameters, artifacts, and other configuration data corresponding to the services of the composite application. The keywords (e.g., id, graph, name, source, params, description, artifacts, file, and so forth) specified in the nulecule are provided merely as an example.

In other examples, other keywords may be specified instead of or in addition to those listed. The keywords that may be included in the nulecule file may be configured by a nulecule specification. In the present example, each keyword is associated with a value, which is shown below or to the side of the keyword. This layout of the keywords and values for the nulecule 200 is provided merely as an example. In other examples, other arrangements of the keywords and the values may be configured by modifying the nulecule specification.

In the present example, the nulecule is a text file having three portions 202, 204 and 206 that define the composite application to include two services, a webserver service and a database service. Dashed lines have been inserted into the example layout merely to distinguish between the different portions 202, 204 and 206 for the purposes of explaining the example. In other examples, each portion may be separated by a colon, carriage return and/or other delimiter. Further, while the present example discusses a web server service and a database service, these are merely examples, and it is intended that any number and type of services may be defined in a nulecule.

A first portion 202 of the nulecule specifies an identifier of the composite application that is defined by the nulecule. The nulecule includes the keyword id that is associated with the name of the composite application that is specified by the value webserver-app. In some examples, the first portion 202 may also include other metadata corresponding to the composite application, such as version information.

A second portion 204 of the nulecule identifies services, identifiers of container images corresponding to the services, service run order, and parameters corresponding to the services, such as login credentials, network location information, and so forth. In some examples, the order in which the services are defined in the nulecule may be the order in which the services are instantiated/run. In other examples, other metadata may be included that specifies a run ordering.

In the present example, the second portion 204 provides a name keyword corresponding to each of the services of the composite application. In this example, the nulecule provides the name keyword to specify a database service named database and a webserver service named webserver. The source keyword specifies an identifier of the container image that includes the application(s) and any other files corresponding to the service. For example, the container image may include a first group of one or more applications for performing the service, configuration and data files corresponding to the service, and so forth. In the present example, the value corresponding to the source keyword may be parsed and provided to a container manager to retrieve the container image that includes the files for providing the service from a container registry. Accordingly, the source keyword specifies the service by reference, such that the nulecule may be distributed without also including the content of the services that are referenced in the nulecule. These services may be deployed by retrieving the container images corresponding to the services from the location specified by the source keyword. In the present example, each container image corresponding to a service has a unique identifier that distinguishes the container image from other container images. Accordingly, the unique identifier may be sent to a container registry in a request, and the container registry may identify the corresponding container image and provide the container image in response to the request.

The second portion 204 is also structured to specify parameters corresponding to the services. In the present example, these parameters are specified by a name keyword.

Each name keyword also includes a corresponding description keyword that is associated with a value corresponding to the description of the parameter. In some examples, the description corresponding to a parameter name may be presented to a user in order for the user to input the parameter value corresponding to the parameter name. For example, a dialog box or command line message may be presented to a user that describes a particular parameter and asks the user to specify the value of the parameter. Parameters may also include default parameters, which may be presented to a user so that the user may simply select the default parameter. In some examples, services may be specified to have one or more parameters. In other examples, services may be included without specifying any parameters.

The third portion 206 is structured to specify artifacts. In the present example, the nulecule specifies a container manager and an orchestrator as the artifacts for processing the composite application. These artifacts are provided merely as examples, and it is intended that other artifacts may be specified as well. For example, the specified container manager and orchestrator artifacts may be modified to specify different container managers and orchestrators, as well as additional artifacts that may be used for processing the composite application. Processing the composite application includes, for example, packaging, transporting, deploying, and instantiating the services included in the composite application.

For each artifact, the nulecule 200 also specifies a configuration file that may be passed to the corresponding artifact, such that the artifact may be provided with additional configuration information for processing the services specified in the nulecule file. As shown, the file keyword is associated with a value that specifies the configuration file for a particular artifact. In some examples, the configuration file specified for the container manager may include a command that may be executed to trigger the container manager to run the services. In another example, the configuration file specified for the orchestrator may include various configuration parameters to be used for instantiating the services. In other examples, the artifacts and the configuration files specified for the artifacts may be modified to include additional artifacts, fewer artifacts, or artifacts that are different than those discussed above.

Figure 3:
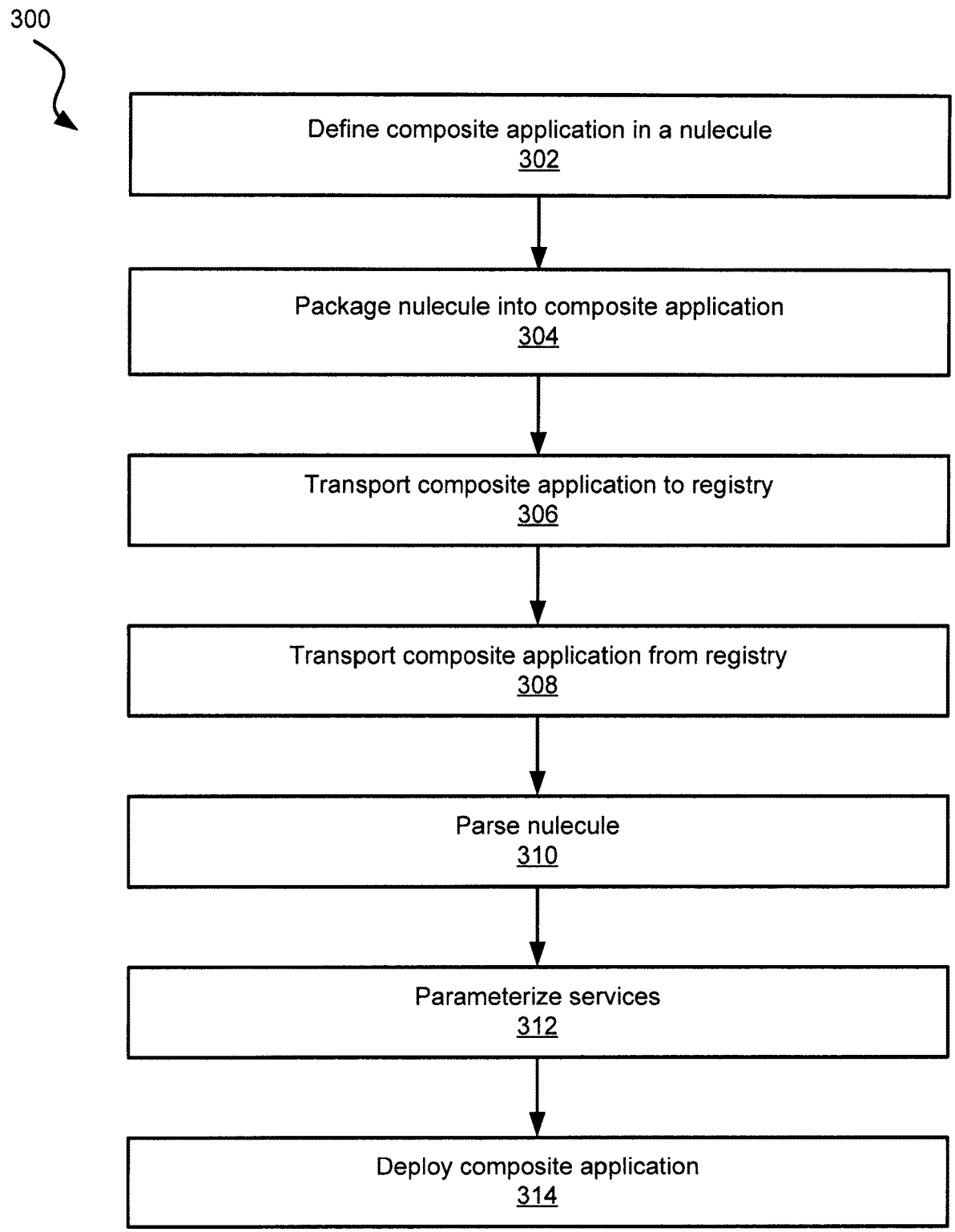
FIG. 3 is a flow diagram illustrating a method for packaging, distributing, and deploying a composite application, in accordance with various examples of the present disclosure.

FIG. 3 is a flow diagram illustrating a method for packaging, distributing, and deploying a composite application, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 302, the composite application is defined in a nulecule by specifying the services, parameters, artifacts, and other configuration data corresponding to the composite application. In some examples, the defining is performed by a user. In other examples, the defining may be automated. In the present example, the specifying of the services includes specifying the unique identifiers of the services that correspond to the identifiers of the services in a registry. Parameters may be associated with the services, a run order may be specified for the services, artifacts used to operate on the composite application may be specified, and so forth.

At action 304, the nulecule is packaged into a composite application by a container manager. In the present example, the composite application is structured as a container image.

In some examples, configuration files corresponding to the artifacts may also be included in the composite application with the nulecule. In some examples, the services specified in the nulecule are packaged into the composite application with the nulecule. For example, container images that include software applications corresponding to the services may be stored within the composite application itself. In other examples the services are included merely by referencing the services such that the services may be retrieved from an external location, without including the software applications corresponding to the services themselves in the composite application.

At action 306, the composite application is transported from a developer computing device to a registry. In some examples, the container image is uploaded to the registry using a container manager. The transporting of the composite application may be performed by a container manager.

At action 308, the composite application is transported to from the registry to a runtime computing device. In some examples, the composite application is transported from a developer computing device to a runtime computing device without first being transported to a registry. The transporting of the composite application may be performed by a container manager. The runtime computing device may be a same or a different computing device as the developer computing device. In some examples, the runtime computing device may also be referred to as a client computing device. In some examples, the runtime computing device is a same computing device as the developer computing device, while in other examples the computing devices are separate devices that are communicatively coupled via a network.

At action 310, active code of the runtime computing device parses the nulecule in the container image according to the nulecule specification. The active code uses the nulecule specification to identify the keywords of the nulecule and their associated values. Accordingly, the active code identifies the services of the composite application, parameters of those services, artifacts, and other configuration information based on the information specified in the nulecule.

At action 312, parameters parsed from the nulecule by the active code may be presented to a user to update or select values for the parameters. The parameter values that are input are received by the active code and used to modify a configuration value of one or more services. This may be referred to as parameterizing the composite application. For example, a composite application may include a default username for a service, which may be modified by a user in order to parameterize the service with another username that is different than the default value. In some examples, each parameter name of the nulecule is associated with a configuration value in a configuration file of a service, such that the active code is able to identify the configuration value to modify with the input parameter value. In other examples, the input parameters are provided to an artifact, such as an orchestrator that is executed to perform the parameterization. For example, the orchestrator may be executed with the parameter values provided as arguments to input the parameter values to the orchestrator.

At action 314, the active code provides the identifiers of the services to the orchestrator and/or container manager. For example, the active code may execute the orchestrator or container manager with the identifiers of the services included as arguments. The orchestrator and/or container manager are executed to retrieve the container images corresponding to the services. For example, the container images may be requested from a registry by a container manager querying the registry with the provided service identifiers, and in response to the request sent from the registry and received by the runtime computing device. In some examples, the orchestrator may interact with the container manager to retrieve the container images.

After retrieving the container images corresponding to the services, the container manager may unpack the applications corresponding to the services from the container images and the orchestrator may modify the configuration files of the services to include the parameter values that were input at action 312.

Following the modifying of the configuration files, the orchestrator may then instantiate the services in the order specified in the nulecule. Instantiating a service may include, for example, executing applications that are included in the container images such that the services are run on the runtime computing device.

Figure 4:
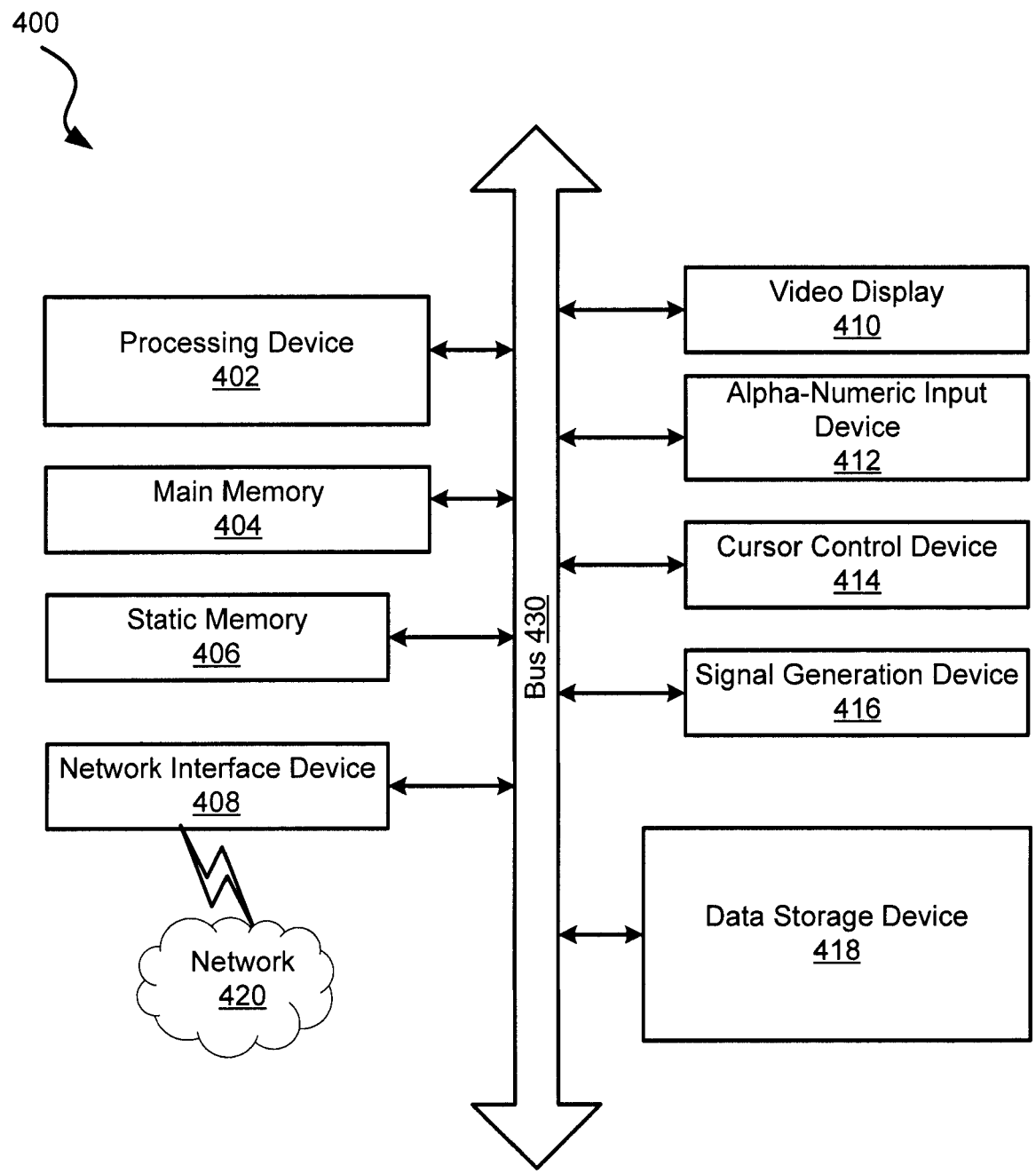
FIG. 4 is a block diagram illustrating a computer system that may perform one or more of the operations described herein.

FIG. 4 illustrates a diagram of a machine in the form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "instantiating," "determining," "generating," "deploying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method comprising:
   receiving, at a computing device, a container image that includes at least one application, a nulecule file that defines at least one service corresponding to the at least one application, and one or more other files corresponding to the at least one service;
   parsing the nulecule file according to a nulecule specification to identify a first service, a second service, a parameter corresponding to the first service, and a first unique identifier that references a first container image that is stored in a container registry, and an artifact for processing the at least one application, wherein the nulecule specification provides additional configuration information for processing the first service by passing a configuration file corresponding to the first service to the artifact, wherein the nulecule specification defines preconfigured keywords to be used during the parsing;
   requesting, from the container registry, the first container image corresponding to the first service and a second container image corresponding to the second service;
   receiving the first container image and the second container image from the container registry, wherein the container registry stores the first container image and the second container image;
   presenting the parameter to a user, the user selecting or updating an input value for the parameter;
   receiving the input value corresponding to the parameter;
   modifying a configuration value in the configuration file corresponding to the first service to include the input value;
   deploying the first service by instantiating the first container image on the computing device; and
   deploying the second service by instantiating the second container image on the computing device.

2. The method of claim 1, wherein the first container image includes a first application corresponding to the first service, and wherein the second container image includes a second application corresponding to the second service.

3. The method of claim 1, wherein parsing the nulecule file to identify the first service and the second service includes:
   parsing a second unique identifier that references the second container image that is stored in the container registry.

4. The method of claim 1, the method further comprising:
   parsing a runtime order corresponding to the first service and the second service, wherein the runtime order specifies that the second service is to be deployed prior to the first service; and
   deploying the first service and the second service in the runtime order.

5. The method of claim 1, wherein the second service is a dependency of the first service.

6. The method of claim 1, wherein the input value includes one or more of:
   network location information and login credential information.

7. The method of claim 1, the method further comprising:
   specifying, in the nulecule file, information corresponding to the first service, the second service, and the parameter;
   packaging the nulecule file in the container image; and
   sending the container image to the container registry.

8. The method of claim 1, the method further comprising:
   querying, by the computing device, the container registry for the first container image corresponding to the first service; and
   sending the first container image from the container registry to the computing device.

9. A non-transitory computer-readable medium, comprising computer-readable instructions executable by a processor to cause the processor to:
   receive a container image that includes at least one application, a nulecule that defines at least one service corresponding to the at least one application, and one or more other files corresponding to the at least one service;
   parse the nulecule according to a nulecule specification to identify a first service, a second service, parameter of the first service, and a first unique identifier that references a first container image that is stored in a container registry, and an artifact for processing the at least one application, wherein the nulecule specification provides additional configuration information for processing the first service by passing a configuration file corresponding to the first service to the artifact wherein the nulecule specification defines preconfigured keywords to be used during the parsing;
   request, from the container registry, the first container image and a second container image;
   receive the first container image and the second container image from the container registry, wherein the container registry stores the first container image and the second container image;
   present the parameter to a user, the user selecting or updating an input value for the parameter;
   receive the input value corresponding to the parameter;
   modify a configuration value in the configuration file of the first service to include the input value; and
   deploy the first service and the second service, wherein the deployed first service is configured with the configuration value.

10. The medium of claim 9, wherein the first service interacts with the second service.

11. The medium of claim 10, the instructions further executable by the processor to cause the processor to:
    parse a runtime order corresponding to the first service and the second service, wherein the runtime order specifies that the second service is to be deployed prior to the first service; and deploy the first service and the second service according to the runtime order.

12. The medium of claim 10, wherein the second service is a dependency of the first service.

13. The medium of claim 9, the instructions further executable by the processor to cause the processor to:
parse the nulecule to identify a second unique identifier that references the second container image that is stored in the container registry.

14. The medium of claim 9, wherein the input value includes at least one information selected from the group consisting of: a network location information and a login credential information.

15. A computer-implemented method comprising:
receiving, at a computing device, a container image that includes at least one application, a nulecule file that defines at least one service corresponding to the at least one application, and one or more other files corresponding to the at least one service;
parsing the nulecule file according to a nulecule specification to identify a first service, a second service, a parameter corresponding to the first service, and a first unique identifier that references a first container image that is stored in a container registry, and an artifact for processing the at least one application, wherein the nulecule specification provides additional configuration information for processing the first service by passing a configuration file corresponding to the first service to the artifact, wherein the nulecule specification defines preconfigured keywords to be used during the parsing;
requesting, from the container registry, the first container image corresponding to the first service and a second container image corresponding to the second service;
receiving the first container image and the second container image from the container registry, wherein the container registry stores the first container image and the second container image;
presenting the parameter to a user, the user selecting or updating an input value for the parameter;
receiving the input value corresponding to the parameter;
modifying a configuration value in the configuration file corresponding to the first service to include the input value.

16. The method of claim 15, wherein the first container image includes a first application corresponding to the first service, and wherein the second container image includes a second application corresponding to the second service.

17. The method of claim 15, wherein parsing the nulecule file to identify the first service and the second service includes:
parsing a second unique identifier that references the second container image that is stored in the container registry.

18. The method of claim 15, the method further comprising:
parsing a runtime order corresponding to the first service and the second service, wherein the runtime order specifies that the second service is to be deployed prior to the first service; and
deploying the first service and the second service in the runtime order.

19. The method of claim 15, wherein the second service is a dependency of the first service.

20. The method of claim 15, wherein the input value includes one or more of: network location information and login credential information.

* * * * *